United States Patent Office 3,775,408
Patented Nov. 27, 1973

3,775,408
PROCESS FOR PRODUCING CEPHALOSPORIN DERIVATIVES
Michihiko Ochiai, Suita, Osami Aki, Kawanishi, Akira Morimoto, Suita, Taiiti Okada, Kyoto, and Katsutada Masuda, Ashiya, Japan, assignors to Takeda Chemical Industries, Ltd., Osaka, Japan
No Drawing. Filed Dec. 27, 1971, Ser. No. 212,744
Claims priority, application Japan, Dec. 24, 1970, 45/127,468
Int. Cl. C07d 99/24
U.S. Cl. 260—243 C        9 Claims

ABSTRACT OF THE DISCLOSURE

The process of reacting a cephalosporin compound of the formula

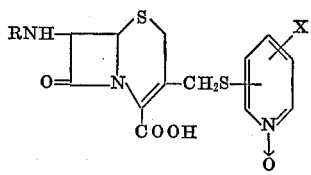

wherein R is H or an acyl group and X is H or halogen or a salt thereof with methanol in the presence of a divalent copper compound results in the production of (A) the corresponding compound of the formula

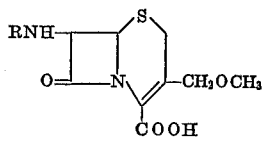

or a salt thereof, (B) the corresponding compound of the formula

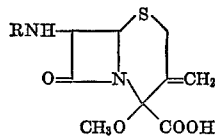

or a salt thereof, or (C) a mixture of said compounds or their salts.

The 3-methoxymethyl compounds have antibacterial properties. The compounds of the formula

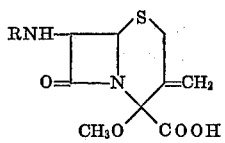

can be isomerized to the corresponding 3-methoxymethyl compounds.

---

This invention relates to a process for producing cephalosporin derivatives, and more particularly, to a process for producing at least one of two cephalosporin derivatives, respectively, represented by the general formulae

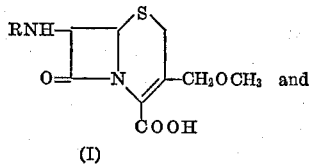 and 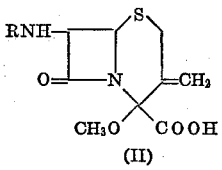

(I)                                    (II)

wherein R is hydrogen or an acyl group; or at least one of the salts thereof, which comprises reacting cephalosporin compounds represented by the general formula:

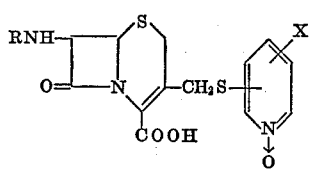

(III)

wherein R is as defined above, X is hydrogen or a halogen; or a salt thereof, with methanol in the presence of a divalent copper compound.

Heretofore, cephalosporin derivatives have been known to have excellent antibacterial activities and show good absorption and distribution in the living body and derivatives such as cephalothin, cephaloridine and cephalexin have been commercially used. Among them, 7-(D-2'-amino - 2' - phenylacetamido) - 3 - methoxymethyl - 3-cephen-4-carboxylic acid has been reported to possess the most excellent value in the treatment of various infections when orally administered. Among the hitherto known methods for the production of such 3-methoxymethyl compound there are, for example, (1) bromination of 3-methyl cephalosporin derivatives which can be prepared from penicillin or cephalosporin C and alkoxylation of the thus obtained 3-bromomethyl derivatives (e.g. Netherlands patent application No. 6902013) and (2) chemical or enzymatic hydrolysis of 3-acetoxymethyl cephalosporins and alkylation of the thus obtained 3-hydroxymethyl compounds (e.g. Belgian Pat. No. 719,710). However, these methods require protection of the carboxyl group at the 4-position and, therefore, require rather involved steps. Furthermore, the bromination step of method (1) is easily accompanied by the transposition of the double bond from 3-position to 2-position, while the method (2) is hardly applicable to those compounds containing chemically active β-lactam ring and carboxylic group. Due to these disadvantages, the known methods provide only a very poor overall yield and, therefore, are not fully satisfactory from industrial points of view.

It has been found that methoxymethyl compounds (I) can be obtained in a high yield by reacting the N-oxide compounds (III) with methanol in the presence of a divalent copper compound.

When a relatively small amount of a divalent copper compound is used in this reaction, the exomethylene compounds (II) are in some cases produced as by-products which can be isomerized to the methoxymethyl compounds (I), and which are also useful as intermediates for other cephalosporin derivatives. These methods are entirely free from the disadvantages inherent in the conventional methods mentioned above and enable the desired compounds to be produced without difficulty in a high purity and in a good yield.

The principal object of the present invention is to provide a novel and industrial process for producing methoxymethyl compounds (I).

Another object of the present invention is to provide the exomethylene compounds (II), which are convertible to the methoxymethyl compounds (I) and methods for producing the exomethylene compounds (II).

A further object of the present invention is to provide a process for producing the methoxymethyl compounds (I) by isomerizing the exomethylene compounds (II).

Other objects of the present invention and advantages thereof will become apparent as the description proceeds.

The starting compounds of the present invention, i.e. the N-oxide compounds (III) can be obtained by, for example, reacting a compound of the formula,

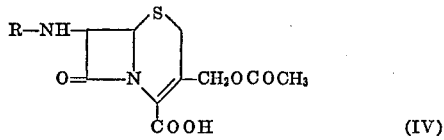

(IV)

wherein R is hydrogen or an acyl group; or salts thereof, with a compound of the formula,

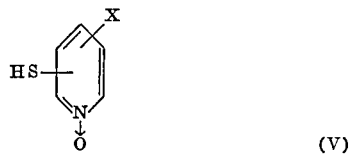

(V)

wherein X is hydrogen or a halogen; or salts thereof (U.S. patent application No. 167,454 filed on July 29, 1971).

In those compounds of the formula from (I) to (IV), the acyl group is particularly the group derived from carboxylic acid or substituted carboxylic acid and may include any one which has been used as the N-acyl of the known cephalosporin or penicillin compounds. Among them, the acyl groups represented by the formula:

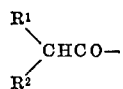

wherein $R^1$ is phenyl, phenoxy, cyclohexenyl, thienyl or 3-amino-3-carboxypropyl group and $R^2$ is hydrogen or amino or sulfo group are preferred. Examples of the acyl group are 5-amino-5-carboxyvaleryl, thienylacetyl, phenylglycyl, α-sulfophenylacetyl, pyridylthioacetyl, cyclohexenylglycyl, phenylacetyl, phenoxyacetyl, α-phenoxypropionyl and α-phenoxybutyryl. When amino and/or carboxyl groups are included in the above acyl groups, such amino and/or carboxyl groups may also be protected by conventional way. In addition, the acyl group includes 2,6 - dimethoxybenzoyl, 5 - methyl-3-phenyl-4-isoxazolylcarbonyl, 3-o-chlorophenyl - 5 - methyl-4-isoxazolylcarbonyl, 3 -( 2,6-dichlorophenyl)-5-methyl-4-isoxazolylcarbonyl, 2,2 - dimethyl - 5-oxo-4-phenyl-1-imidazolyldinyl, tetrazolylacetyl, β-ethylsulfonylethoxycarbonyl, β-phenylsulfonylethoxycarbonyl, acylaminomethylphenylacetyl and the like. Symbol X appearing in the Formula V signifies hydrogen or halogen such as chlorine, bromine or the like. Those compounds from (I) to (IV) may also be in a form of salt with, for example, sodium, potassium, magnesium, calcium, aluminum, triethylamine or the like.

The cephalosporin derivatives (I) or/and (II) in the present invention can be produced by reacting compounds of the Formula III with methanol in the presence of divalent copper compounds.

As the divalent copper compounds which are to be employed in the process of this invention, such inorganic and organic copper compounds as cupric chloride, cupric bromide, cupric fluoride, cupric nitrate, cupric sulfate, cupric borate, cupric phosphate, cupric cyanide, cupric formate, cupric acetate, cupric propionate, cupric citrate, cupric tartarate cupric benzoate, cupric salicylate, etc. may be utilized. In addition to the compounds mentioned above, any divalent copper compound may also be employed only if it will not adversely affect the reaction of this invention. Those divalent copper compounds are preferably employed in the amount of a half mole or more to the starting N-oxide compounds (III). When the amount of the divalent copper compounds against the amount of N-oxide compounds (III) increase, the production of a methoxymethyl compound (I) increases. When more than 2 moles of a suitable divalent copper compound relative to an N-oxide compounds (III) are used, it can be expected to obtain exclusively the methoxymethyl compounds (I). There also are cases in which the desired product is obtained more smoothly when the reaction is carried out using two or more such divalent copper compounds in combination or in the concomitant presence of other metallic compounds such as zinc chloride and iron chloride.

The present reaction may be carried out in an excess volume of methanol in which event it will act as a solvent as well. Of course, any of the conventional solvents may likewise be employed as long as its use does not adversely affect the reaction; exemplary solvents include, such organic solvents as ethers (e.g. tetrahydrofuran, dioxane, etc.) or acetone, acetonitrile, dimethylformamide, dimethylsulfoxide, etc. and various mixtures of such solvents. While the reaction temperature and time depend upon such factors as the types and quantity of N-oxide compounds (III), the divalent copper compound and solvent and the like, the reaction is generally conducted at a temperature of the range from 0 to 80° C., more preferably from 0 to 40° C., for a period varying from a few minutes to several days, more preferably from 5 minutes to 5 hours.

By selecting a suitable combination of reaction conditions within the scope hereinbefore indicated, the methoxymethyl compounds (I) and the exomethylene compounds (II), as well as their salts, can be produced either selectively or as a mixture.

The exomethylene compounds (II) thus obtained can be isomerized to the methoxymethyl compounds (I). The isomerization proceeds easily in the presence of acidic catalysts, for example, an inorganic acid such as hydrogen chloride, sulfuric acid, organic sulfonic acids such as toluene-sulfonic acid, etc. and sulfonic acid resin, and the like. The reaction may be carried out in conventional solvents which do not interfere with the isomerization reaction and at a temperature of usually lower than room temperature. Generally, the reaction is complete within the time of from several minutes to several days.

When a mixture of the methoxymethyl compounds (I) and the exomethylene compounds (II) is obtained, each compound can be isolated by conventional methods, for example, column chromatography, extraction, isoelectric precipitation, countercurrent distribution, recrystallization and the like. It is advantageous to employ the isomerization procedure mentioned above with the mixture to obtain the methoxymethyl compounds (I).

According to the present invention the methoxymethyl compounds (I) can be obtained in a high purity and in a good overall yield in only two steps from the corresponding 3-acetoxymethyl compounds. The exomethylene compounds (III) obtainable according to this invention are useful in preparing the 3-methoxymethyl compounds and as intermediates for the synthesis of new cephalosporin derivatives.

It is to be understood that the following examples are solely for the purpose of illustration and not to be construed as limitation of this invention.

In this specification, "part" means "weight part" unless otherwise specified, and the relationship between "part(s)" and "part(s) by volume" corresponds to that gram(s) and milliliter(s).

EXAMPLE 1

In 50,000 parts by volume of anhydrous methanol is dissolved 247 parts of sodium 7-(2'-thienylacetamido)-3-(2" pyridylthiomethyl)-3-cephem-4-carboxylate 1"-oxide and, under stirring at room temperature, 134 parts of cupric chloride is added to the resultant solution. The mixture is further stirred for 15 minutes, and the solvent is distilled off under reduced pressure.

To the residue are added 5000 parts by volume of a saturated aqueous solution of sodium chloride and 1000 parts by volume of 2% hydrochloric acid are added, and then the mixture is extracted with 1000 parts by volume of ethyl acetate. The ethyl acetate layer is dried over magnesium sulfate and the solvent is distilled off. To the residue is added 2000 parts by volume of 0.35% aqueous solution of sodium hydrogen carbonate.

The resulting solution is passed through a column packed with polystyrene resin (Amberlite XAD-II), and the fractions containing sodium 7-(2'-thienylacetamido)-3-methoxymethyl-3-cephem-4-carboxylate and sodium 7-(2'-thienylacetamido) - 3 - exomethylene - 4 - methoxycepham-4-carboxylate are collected. Lyophilization of the fractions give 75 parts of the former compound and 75 parts of the latter compound.

The ultraviolet absorption spectrum (water) of the former compound shows an absorption of the $\Delta^3$-cephem ring at 260 m$\mu$. The nuclear magnetic resonance spectrum ($D_2O$, 100 Mc.) shows a singlet due to the 3-methoxy protons at 3.52 p.p.m., an AB quartet due to the 2- methylene protons at 3.69 p.p.m., a singlet due to the 2-methylene protons of thiophene ring at 4.14 p.p.m., a singlet due to the 3-methylene protons at 4.42, doublets ($J_{6-7}=4$ c.p.s.) due to the $C_6, C_7$-protons at 5.37 and 5.84 p.p.m., respectively, and a multiplet due to the thiophene ring protons at 7.28–7.60 p.p.m.

The ultraviolet absorption spectrum (water) of the latter compound shows an absorption maximum at 237 m$\mu$ and does not show the absorption of a $\Delta^3$-cephem ring at 260 m$\mu$. The nuclear magnetic resonance spectrum ($D_2O$, 100 Mc.) shows a singlet due to the 4-methoxy protons at 3.60 p.p.m., an AB quartet due to the 2-methylene protons at 3.75 p.p.m., a singlet due to the 2-methylene protons of thiophene ring at 4.16 p.p.m., a broad singlet due to the 3-exomethylene protons at 5.59 p.p.m. and a multiplet assignable to the thiophene ring protons at 7.26–7.58 p.p.m.

EXAMPLE 2

In 30,000 parts by volume of anhydrous methanol is dissolved 247 parts of sodium 7-(2'-thienylacetamido)-3-(2''-pyridylthiomethyl)-3-cephem-4-carboxylate 1''-oxide and, under stirring at room temperature, 100 parts of cupric acetate is added to the resultant solution. The mixture is further stirred for 30 minutes and the reaction mixture is treated in a similar manner as Example 1. The resulting ethyl acetate layer is dried and treated with diazomethane. The ethyl acetate layer is concentrated and the concentrate is poured onto the column packed with silica gel, and eluted with a mixture of benzene and ethyl acetate, and are collected, the fractions containing methyl 7-(2' - thienylacetamido) - 3 - methoxymethyl-3-cephem - 4 - carboxylate and methyl 7-(2-thienylacetamido)-3-exomethylene-4-methoxy-cepham - 4 - carboxylate, followed by evaporation of the solvent. The former 79 parts and the latter 73 parts.

The former compound has a melting point of 169–171° C. and a molecular weight of 382 as determined by mass analysis (theory 382). The elementary analysis: Calcd. for $C_{16}H_{18}N_2O_5S_2$: C, 50.24; H, 4.74; N, 7.32; found: C, 50.10; H, 4.78; N, 7.71. The infrared absorption spectrum (chloroform solution) shows absorptions at 1785 cm.$^{-1}$ ($\beta$-lactam), 1725 cm.$^{-1}$ (4-methyl ester) and 1100 cm.$^{-1}$ (methoxy). The ultraviolet absorption spectrum (methanol) shows an absorption due to the $\Delta^3$-cephem ring at 260 m$\mu$. The nuclear magnetic resonance spectrum (deuteriochloroform, 100 Mc.) shows a singlet due to the 3-methoxy protons at 3.32 p.p.m., a broad singlet due to the 2-methylene protons at 3.50 p.p.m., a singlet due to the 4-methyl ester protons at 3.84 p.p.m., a singlet due to the 2-methylene protons of thiophene ring at 3.86 p.p.m., a broad singlet due to the 3-methylene protons at 4.28 p.p.m., a doublet ($J_{6-7}=4$ c.p.s.) due to the $C_6$ proton at 4.95 p.p.m., a doublet of doublet ($J_{7-6}=4$ c.p.s., $J_{7-NH}=10$ c.p.s.) due to the $C_7$ hydrogen proton at 5.28 p.p.m., and a multiplet due to the thiophene ring protons at 6.95–7.28 p.p.m.

The latter compound has a molecular weight of 382 (theory 382) as determined by mass analysis. The infrared absorption spectrum (chloroform) shows absorptions at 1780 cm.$^{-1}$ ($\beta$-lactam), 1760 cm.$^{-1}$ (4-methyl ester), 1100 cm$^{-1}$ (methoxy) and 930 cm.$^{-1}$ (3-exomethylene). The ultraviolet absorption spectrum (methanol) shows an absorption maximum at 233 m$\mu$ and does not show the absorption characteristic of the $\Delta^3$-cephem ring at 260 m$\mu$. The nuclear magnetic resonance spectrum (deuteriochloroform, 100 Mc.) shows a singlet due to the 4-methoxy protons at 3.22 p.p.m., an AB quartet due to the 2-methylene protons at 3.25 p.p.m., a singlet due to the 4-methyl ester at 3.81 p.p.m., a singlet due to the 2-methylene protons of thiophene ring at 3.86, a doublet ($J_{6-7}=4$ c.p.s.) due to the $C_6$ proton at 5.02 p.p.m., an AB quartet due to the 3-exomethylene protons at 5.50 p.p.m., doublet of doublet ($J_{7-6}=4$ c.p.s., $J_{7-NH}=9$ c.p.s.) due to the $C_7$ proton at 5.60 p.p.m. and a multiplet due to the thiophene ring protons at 6.94–7.32 p.p.m.

EXAMPLE 3

In 30,000 parts by volume of anhydrous methanol is dissolved 247 parts of 7-(2'-thienylacetamido)-3-(2''-pyridylthiomethyl)-3-cephem-4-carboxylic acid 1''-oxide sodium salt, followed by the addition of 80 parts of cupric sulfate. The mixture is stirred at room temperature for 1 hour and the reaction mixture is treated in a similar manner as in Example 1.

The procedure gives sodium (2'-thienylacetamido)-3-methoxymethyl-3-cephem-4-carboxylate and sodium 7-(2'-thienylacetamido)-3-exomethylene-4-methoxycepham-4-carboxylate, which are identical respectively with the substances obtained in Example 1. The former 68 parts and the latter 66 parts.

EXAMPLE 4

In 30,000 parts by volume of methanol is dissolved 1990 parts of sodium 7-(2'-thienylacetamido)-3-(2''-pyridylthiomethyl)-3-cephem-4-carboxylate 1''-oxide, followed by the addition of 1660 parts of cupric chloride.

The mixture is stirred at 24° C. for 30 minutes. After hydrogen sulfide gas is introduced into the reaction mixture for 15 minutes, insoluble matters are removed by filtration. The filtrate is concentrated under reduced pressure, and the residue is dissolved in ethyl acetate and the resultant solution is extracted with 5% aqueous solution of sodium hydrogen carbonate. The water layer is acidified by the addition of diluted hydrochloric acid and then extracted with ethyl acetate. To the dried ethyl acetate layer is added 2000 parts by volume of anhydrous ether, and then isopropanol solution of sodium 2-ethylhexanoate until no more precipitation occurs. The precipitate is collected and washing with anhydrous ether to give 1000 parts of sodium 7-(2'-thienylacetamido)-3-methoxymethyl-3-cephem-4-carboxylate, which is identical with the specimen obtained in Example 1.

EXAMPLE 5

To the suspension of 2.37 parts of 7-(2'-thienylacetamido)-3-(2''-pyridylthiomethyl)-3-cephem-4-carboxylic acid 1''-oxide in 50 parts by volume of methanol is added 1.27 parts of dimethoxy copper. The mixture is stirred for 4 hours at room temperature.

The reaction mixture is filtered and the filtrate is concentrated under reduced pressure at room temperature. The residue is extracted three times each with 50 parts by volume of 0.1 M sodium phosphate solution. The combined extract is acidified by the addition of diluted hydrochloric acid, followed by extracting three times each with 50 parts by volume of ethyl acetate.

The combined ethyl acetate layer is washed with a saturated aqueous solution of sodium chloride and then dried over magnesium sulfate. To the ethyl acetate layer is added 20 parts by volume of anhydrous ether, and then isopropanol solution of sodium 2-ethylhexanoate until no more precipitation occurs. The precipitate is collected and washed with anhydrous ether to give 0.79 part of sodium 7-(2'-thienylacetamido)-3-exomethylene-4-methoxycepham-4-carboxylate, which is identical with the salt obtained in Example 1.

EXAMPLE 6

In 10,000 parts by volume of methanol is added 580 parts of 7-(D-2'-amino-2'-phenylacetamido)-3-(2"-pyridylthiomethyl)-3-cephem-4-carboxylic acid 1"-oxide trifluoroacetate and 400 parts of cupric chloride, the mixture is stirred at 27° C. for 30 minutes. After hydrogen sulfide gas is introduced into the reaction mixture, the insoluble matters are removed by filtration. The filtrate is concentrated under reduced pressure and the residue is dissolved in 5% aqueous solution of sodium hydrogen carbonate. The resulting solution is passed through a column packed with polystyrene resin (Amberlite, XAD–II), and the fractions containing sodium 7-(D-2' - amino-2'-phenylacetamido)-3-exomethylene-4-methoxycepham-4-carboxylate are collected. Lyophilization of thus combined fraction gives 190 parts of sodium 7-(D-2' - amino - 2'-phenylacetamido)-3-exomethylene-4-methoxycepham-4-carboxylate.

*Elementary analysis.* — Calcd. for $C_{17}H_{18}N_3O_5SNa \cdot \frac{1}{2}H_2O$ (percent): C, 50.00; H, 4.69; N, 10.29. Found (percent): C, 50.52; H, 4.60; N, 10.18.

The nuclear magnetic resonance spectrum ($D_2O$, 100 Mc.) shows a singlet due to the 2-methylene protons at 3.40 p.p.m., a singlet due to the methoxy protons at 3.56 p.p.m., a broad singlet due to the 3-exomethylene protons at 5.54 p.p.m., doublets due to the $C_6,C_7$-protons at 5.28 and 5.78 p.p.m., respectively, and a singlet due to the phenyl ring protons at 7.63 p.p.m. The ultraviolet absorption spectrum (water) of this compound shows no absorption at 260 m$\mu$ attributable to $\Delta^3$-cepham ring.

EXAMPLE 7

To 500 parts by volume of methanol is added 5.86 parts of sodium 7-[2'-(N-t-butoxycarbonylamino)-2'-(1"-cyclohexenyl) acetamido] - 3 - (2"'-pyridylthiomethyl)-3-cephem-4-carboxylate 1"'-oxide and 2.7 parts of cupric chloride. The mixture is stirred at 40° C. for 2 hours. After hydrogen sulfide gas is introduced into the reaction mixture, the insoluble matter is removed by filtration. The filtrate is concentrated under reduced pressure, and the residue is dissolved in ethyl acetate and the ethyl acetate layer is washed with a saturated aqueous solution of sodium chloride and dried over magnesium sulfate. Ethyl acetate is distilled off to obtain an oily residue. To the oily residue is added a mixture of 24 parts of trifluoroacetic acid and 6 parts of anisol and the mixture is kept standing at room temperature for 5 minutes. The mixture is concentrated under reduced pressure and the concentrate is dissolved in 5% aqueous solution of sodium hydrogen carbonate. The resulting solution is passed through a column packed with polystyrene resin (Amberlite XAD–III), and the fractions containing sodium 7-[2'-amino-2'-(1"-cyclohexenyl) acetamido]-3-methoxymethyl-3-cephem-4-carboxylate are collected. Lyophilization of thus combined fraction gives 0.72 part of sodium 7-[2'-amino-2'-(1"-cyclohexenyl) acetamido]-3-methoxymethyl-3-cephem-4-carboxylate.

The ultraviolet absorption spectrum (water) of this compound shows an absorption maximum at 259 m$\mu$. The infrared absorption spectrum (KBr) shows absorption at 7.3$\mu$ (lactam).

EXAMPLE 8

In 2000 parts by volume of methanol containing 2% hydrogen chloride is dissolved 100 parts of sodium 7-(2'-thienylacetamido) - 3-exomethylene-4-methoxycepham-4-carboxylate and the solution is allowed to stand at 60° C. for 6 hours, followed by distillation of methanol at the temperature lower than 20° C. under reduced pressure. The residue is dissolved in 3000 parts by volume of ethyl acetate and the solution is washed with a saturated aqueous solution of sodium chloride, followed by drying with magnesium sulfate. To the ethyl acetate layer is added 2000 parts by volume of anhydrous ether, and then isopropanol solution of sodium 2-ethylhexanoate until no more precipitation occurs. The precipitate is collected and washed with anhydrous ether to obtain 35 parts of sodium 7 - (2" - thienylacetamido)-3-methoxymethyl-3-cephem-4-carboxylate, which is identical with the specimen obtained in Example 1.

EXAMPLE 9

In 50,000 parts by volume of methanol is added 614 parts of sodium 7-[D-2'-(t-butoxycarbonylamino)-2'-phenylacetamido] - 3 - (2" - pyridylthiomethyl) - 3-cephem-4-carboxylate 1"-oxide and 268 parts of cupric chloride. The mixture is stirred at 50° C. for 3 hours. After hydrogen sulfide is introduced into the reaction mixture for 15 minutes, the cupric sulfide is removed by filtration. The filtrate is condensed under reduced pressure and the residue is dissolved in 5% aqueous solution of sodium hydrogen carbonate. The solution is acidified with hydrochloric acid and extracted with ethyl acetate. After washed with saturated aqueous solution of sodium chloride, the ethyl acetate layer is dried over magnesium sulfate. To the ethyl acetate layer is added potassium 2-ethylhexanoate, until no more precipitation occurs. The precipitate is collected to give 320 parts of potassium 7-[D - 2' - (t - butoxycarbonylamino) - 2' - phenylacetamido]-3-methoxymethyl-3-cephem-4-carboxylate.

The potassium salt is dissolved in 5000 parts by volume of trifluoroacetic acid and the solution is allowed to stand at room temperature for 15 minutes. To the solution is added 50,000 parts by volume of absolute ether and the resultant precipitate is collected which is then dissolved in small quantity of 5% aqueous solution of sodium hydrogen carbonate. From the solution after worked-up through the column packed with polystyrene resin (Amberlite XAD–II), 103 parts of sodium 7-(D-2'-amino-2' - phenylacetamido) - 3 - methoxymethyl - 3 - cephem-4-carboxylate is obtained.

*Elementary analysis:* Calcd. for $$C_{17}H_{18}N_3O_5SNa \cdot \tfrac{1}{2}H_2O$$

(percent): C, 49.99; H, 4.93; N, 10.28. Found (percent): C, 50.07; H, 4.91; N, 10.18.

The ultraviolet absorption spectrum (water) of this compound shows absorption maximum at 259 m$\mu$ ($\epsilon = 7507$) and the nuclear magnetic resonance spectrum ($D_2O$, 100 Mc.) shows a singlet due to 3-methoxy protons at 3.46 p.p.m., AB quartet due to 2-methylene protons at 3.57 p.p.m., a singlet due to methylene protons in 3-methoxymethyl group at 4.36 p.p.m., two doublets due to $C_6,C_7$ protons at 5.31 and 5.92 p.p.m. ($J_{6-7}=4$ c.p.s.), respectively and a singlet due to aromatic protons at 7.75 p.p.m.

What is claimed is:
1. A process which comprises reacting a cephalosporin compound of the formula

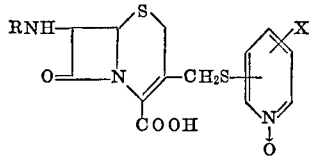

wherein R is H or an acyl group of the formula

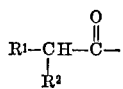

wherein
R¹ represents phenyl, phenoxy, cyclohexenyl, thienyl or 3-amino-3-carboxypropyl and R² is H, amino or sulfo with the proviso that when amino and/or carboxy groups are included in the acyl group, such amino and/or carboxy groups may be protected in the conventional manner, and X is H or halogen, or a salt thereof, with methanol in the presence of at least one-half mole of a divalent copper compound per mole of the cephalosporin compound at a temperature of 0 to 80° C. to produce (A) the corresponding compound of the formula

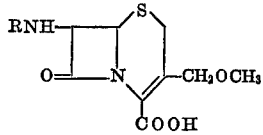

or a salt thereof, (B) the corresponding compound of the formula

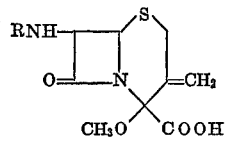

or a salt thereof, or (C) a mixture of said compounds or their salts.

2. A process according to claim 1, wherein R is a group of the formula:

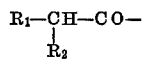

wherein $R_1$ is phenyl, thienyl or cyclohexenyl and $R_2$ is hydrogen or amino.

3. A process according to claim 1 wherein the divalent copper compound is a member selected from the group consisting of cupric chloride, cupric acetate, cupric sulfate and dimethoxy copper.

4. A process for producing a cephalosporin derivative represented by the formula:

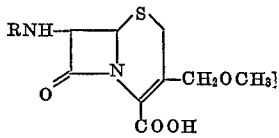

wherein R is hydrogen or an acyl group or a salt thereof, which comprises subjecting the corresponding compound of the formula

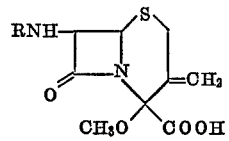

wherein R is as defined above or a salt thereof, to isomerization conditions in the presence of an acidic catalyst.

5. A member selected from the group consisting of (A) a compound of the formula

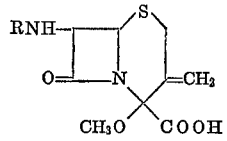

wherein R is H or an acyl group of the formula

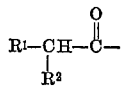

wherein $R^1$ represents phenyl, phenoxy, cyclohexenyl, thienyl or 3-amino-3-carboxypropyl and $R^2$ is hydrogen, amino or sulfo with the proviso that when amino and/or carboxy groups are included in the acyl group, such amino and/or carboxy groups may be protected in the conventional manner, and (B) a salt thereof.

6. A compound according to claim 5, wherein R is a group of the formula:

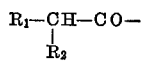

wherein $R_1$ is phenyl, cyclohexenyl or thienyl and $R_2$ is hydrogen or amino.

7. A compound according to claim 5, said compound being 7-(2'-thienylacetamido)-3-exomethylene-4-methoxy-cepham-4-carboxylic acid.

8. A compound according to claim 5, said compound being 7 - (D-2'-amino-2'-phenylacetamido)-3-exomethylene-4-methoxycepham-4-carboxylic acid.

9. A compound according to claim 5, said compound being 7-[2'-amino-2'-(1''-cyclohexenyl) acetamido]-3-methoxymethyl-3-cepham-4-carboxylic acid.

References Cited
UNITED STATES PATENTS
3,660,396    5/1972    Wright _____ 260—243 C HENRY R. JILES, Primary Examiner G. T. TODD, Assistant Examiner U.S. Cl. X.R.
424—246